(12) United States Patent
Gao et al.

(10) Patent No.: US 7,238,288 B1
(45) Date of Patent: Jul. 3, 2007

(54) METHOD FOR ABSORBING AN ION FROM A FLUID

(75) Inventors: Huizhen Gao, Carlsbad, NM (US); Yifeng Wang, Albuquerque, NM (US); Charles R. Bryan, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 37 days.

(21) Appl. No.: 10/918,157

(22) Filed: Aug. 13, 2004

(51) Int. Cl.
*C02F 1/28* (2006.01)
*C02F 1/62* (2006.01)
(52) U.S. Cl. ..................... 210/688; 210/912
(58) Field of Classification Search .......... 210/681, 210/683, 688, 911, 912
See application file for complete search history.

(56) References Cited

U.S. PATENT DOCUMENTS

| | | | |
|---|---|---|---|
| 4,752,397 A | * | 6/1988 | Sood .................... 210/662 |
| 4,867,882 A | * | 9/1989 | O'Neill et al. ............ 210/684 |
| 5,079,203 A | | 1/1992 | Pinnavaia et al. |
| 5,114,691 A | | 5/1992 | Pinnavaia et al. |
| 5,399,329 A | | 3/1995 | Schutz et al. |
| 5,463,042 A | | 10/1995 | Pinnavaia et al. |
| 5,941,037 A | | 8/1999 | Hallock et al. |
| 6,156,696 A | | 12/2000 | Albers et al. |
| 6,372,837 B1 | | 4/2002 | Fischer et al. |

* cited by examiner

*Primary Examiner*—Matthew O. Savage
(74) *Attorney, Agent, or Firm*—Elmer A. Klavetter

(57) ABSTRACT

A method for absorbing an ion from a fluid by using dispersing an organic acid into an anion surfactant solution, mixing in a divalent-metal containing compound and a trivalent-metal containing compound and calcining the resulting solid layered double hydroxide product to form an absorbent material and then contacting the absorbent material with an aqueous solution of cations or anions to be absorbed.

13 Claims, No Drawings

METHOD FOR ABSORBING AN ION FROM A FLUID

METHOD FOR MAKING A METAL OXIDE-CARBON NANOCOMPOSITE

This invention was made with Government support under Contract No. DE-AC04-94AL85000 awarded by the Department of Energy. The Government has certain rights in the invention.

RELATED APPLICATIONS

This application is related to U.S. patent application Ser. No. 09/576,919, filed on May 23, 2000.

BACKGROUND OF THE INVENTION

The invention relates to a method of making a metal oxide-carbon nanocomposite material, and more particularly, to a method of making a metal oxide-carbon nanocomposite material from a layered double hydroxide or hydrotalcite-like material for use in both anion and cation sorption applications.

Hydrotalcite is a naturally occurring anionic clay material in which carbonate ions are located between positively charged sheets of metal hydroxides, having the idealized unit cell formula $[Mg_6Al_2(OH)_{16}(CO_3).4H_2O]$. Synthetic hydrotalcite-like materials, known as layered double hydroxide (LDH) materials, are useful as contact solids in catalytic, oxidative and absorbent processes. LDHs are a group of anionic materials that have positively charged sheets of metal hydroxides, between which are located anions and, in general, some water molecules. Most common LDHs are based on double hydroxides of such main group metals as Mg, and Al and transition metals such as Ni, Co, Cr, Zn and Fe etc. These materials have structures similar to brucite $[Mg(OH)_2]$ in which the magnesium are octahedrally surrounded by hydroxyl groups with the resulting octahedra sharing edges to form infinite sheets. In the LDHs, some of the magnesium is isomorphously replaced by a trivalent ion, such as $Al^{3+}$. The $Mg^{2+}$, $Al^{3+}$, and $OH^-$ layers are then positively charged, necessitating charge balancing by insertion of anions between the layers. Various other divalent and trivalent ions can be substituted for Mg and Al. In addition, the anion, which is carbonate in hydrotalcite, can be varied in synthesis by a large number of simple anions such as $NO_3^-$, $Cl^-$, $OH^-$, and $SO_4^{2-}$. These LDHs, based on their structure, fall into the Hydrotalcite-Manasseite and Pyroaurite-Sjogrenite groups, where brucite-like layers carrying net positive charge alternate with interlayer spaces containing carbonate or other anionic groups and water molecules.

Hydrocalumite and related synthetic compounds also have a layered structure in which positively charged metal hydroxide layers alternate with the interlayers containing anions and water. The hydroxide layers contain specific combinations of metal ions derived from on one hand divalent calcium cations and on the other from trivalent cations of metals such as iron, or more particularly, aluminum. The interlayers contain anions such as $OH^-$, $SO_4^{2-}$, $Cl^-$, $NO_3^-$ and, in particular, $CO_3^{2-}$. The general formula for the group is $[Ca_2M^{3+}(OH)_6]X.yH_2O$, where $M^{3+}$ is a tripositive ion and typically $Al^{3+}$, X is a singly charged anion or equal amounts of more highly charged ones, and y is between 2 and 6. As in the Pyroaurite-Sjogrenite group, principal layers alternate with inter-layers, the principal layers having the composition $[Ca_2M^{3+}(OH)_6]^+$ and the interlayers consisting of water molecules and anion X. However, because of the difference in size between the $Ca^{2+}$ and $Al^{3+}$, the $M^{2+}:M^{3+}$ ratio is fixed at 2:1 and their arrangement is ordered.

The syntheses of LDHs are generally simple, and the so-called "precipitation method" is most popular. If a carbonate-containing product is desired, then the aqueous solution of magnesium and aluminum salts, such as nitrate or chloride salts, is added to an aqueous solution of sodium hydroxide-carbonate with good mixing at room temperature. The resulting amorphous precipitate is then heated for several hours at 60° C.-200° C. to obtain a crystalline material. Washing and drying complete the synthesis in quantitative yield. By employing this precipitation method, replacement of all or part of $Mg^{2+}$ with $M^{II}$ ions such as $Ca^{2+}$, $Zn^{2+}$, and $Cu^{2+}$, or replacement of $Al^{3+}$ with other $M^{III}$ ions such as $Fe^{3+}$ and $Cr^{3+}$, is also possible.

One aspect of the synthesis of these materials is the variation of the nature of the interstitial anion. The preparation of hydrotalcite-like materials with anions other than carbonate in pure form requires special procedures, because LDH incorporates carbonate in preference to other anions. Most of the time, the smaller anions are introduced to the LDH structure via the precipitation method by using the desired anion solutions instead of carbonate. However, in these methods, the synthesis has to be carried out in a controlled atmosphere to prevent carbonate contamination from the atmospheric carbon dioxide.

Pinnavaia et al. (U.S. Pat. No. 5,114,898) describe LDH sorbents for the removal of $SO_x$ from gas streams, where the interlayer anion forms a volatile gas at elevated temperatures and where a metal cation is impregnated as a salt to provide oxidation of sulfur dioxide to sulfur trioxide. Pinnavaia et al. (U.S. Pat. No. 5,069,203) disclose LDH materials interlayered by polyoxometalate ions. Pinnavaia et al. (U.S. Pat. No. 5,463,042) disclose LDH materials interlayered with a metal complex of a polyaryl compound, such as a porphyrin or phthalocyanine. Albers et al. (U.S. Pat. No. 6,156,696) describe LDH materials that incorporate organic acid anionic species to result in crystalline sheet contact materials having increased sorption of $SO_x$. Shutz et al. (U.S. Pat. No. 5,399,329) disclose the synthesis of hydrotalcite-like materials using magnesium and aluminum compounds as the metal ions in the positively charged sheets and using mono carboxylic anions to produce intercalary materials.

DESCRIPTION OF SPECIFIC EMBODIMENTS

In the method of the present invention, a layered double hydroxide (LDH) metal complex material is formed using a long-chain anion surfactant and calcined to form an absorption material that has uses in absorption of both anions and cations. An organic acid of the general form $C_aH_bO_c$ is dispersed in water to form an anion surfactant solution, where $a \geq 5$, $b>0$ and $c>0$. In other embodiments, $a \geq 7$ and in still other embodiments $a \geq 18$, although, in general, $a<20$. A divalent-metal containing compound and a trivalent-metal containing compound are mixed into the anion surfactant solution to form a precursor solution. The precursor solution is then heated to form a solid LDH product in solution. The solid LDH product is separated from the liquid portion of the solution and calcined to form an absorption material.

In the present invention, a crystalline, layered, double hydroxide (LDH) metal complex of the general formula is first formed:

$$M(II)_xM(III)(OH)_{2x+2}(Y/n) \cdot zH_2O$$

wherein M(II) is a divalent metal cation, M(III) is a trivalent metal cation, x is a positive number between 1.5 and 12, Y is an anionic surfactant with at least 7 carbon atoms, n is a positive integer, and z is a positive number less than approximately 10. In the present invention, M(II) is a divalent metal, such as $Co^{2+}$, $Ni^{2+}$, $Zn^{2+}$, $Mg^{2+}$, $Cu^{2+}$, $Cr^{2+}$, $Mn^{2+}$, and $Fe^{2+}$. M(III) is a trivalent metal, such as $Cr^{3+}$, $Al^{3+}$, $Fe^{3+}$, $Sc^{3+}$, $Ti^{3+}$, $V^{3+}$, $Mn^{3+}$, $Co^{3+}$, $Ni^{3+}$, $Rh^{3+}$, $Ru^{3+}$, and $Ir^{3+}$. Y is an anionic surfactant Y that is formed from an organic acid in solution and includes, but is not limited to, organic sulfates, sulfonates, phosphates, phosphonates, and carboxylic acids where generally the carboxylic acids have carbon chains of length of 7-20 carbon atoms. Specific examples of organic acids include stearic acid, terephthalic acid, elaidic acid, and oleic acid. In one embodiment, Y is a surfactant containing two anionic groups. In another embodiment, Y is a surfactant derived from unsaturated fatty acids. In another embodiment, Y is a poly(ethyleneoxide)alkylenecarboxylate surfactant.

Y can be added as a salt or as the free acid conjugate to the surfactant, and the acidic hydrogen, or sodium cation, are not incorporated into the final material. For example, Y can be supplied by sodium dodecyl sulfate (SDS), $C_{12}H_{25}OSO_3^-Na^+$, sodium dodecylbenzenesulfonate, $C_{12}H_{25}C_6H_4SO_3^-$ or other alkylbenzenesulfonates or C5, C6, C7, C8, C12 or C14 alkylsulfonates, Dowfax 8390 (a mono- and di-hexadecyldiphenyl oxide disulfonate), and Westvaco diacid derivatives, which are Diels-Alder adducts of acrylic acid with conjugated bis-unsaturated C-18 carboxylic acids. For the Dowfax and Westvaco materials, the negative charge of these anionic compounds is internal to a chain and is therefore unable to pack in a simple linear manner into the structure. The present invention also comprises layered double hydroxide materials in which the anionic component Y is a compound with greater than approximately 7 carbon atoms and generally less than or equal to approximately 20 carbon atoms, including a compounds that are derivatives of C12-C15 alcohols, or nonylphenol, condensed with ethylene oxide units (generally between approximately 6-12) and terminated with an alkylenecarboxylate group. The composition of the present invention also includes compounds with an unsaturated hydrocarbon chain, such as $Zn_2Al(OH)_6$.oleate, $Zn_2Al(OH)_6$.linoleate, and $Zn_2Al(OH)_6$.elaidate.

In another embodiment, the layered double hydroxide derivatives are compounds in which the anion Y is a surfactant and a neutral non-surfactant substance, such as a hydrocarbon is incorporated into, or intimately associated with, the layered double hydroxide system. Materials of this type can be represented by $M(II)_xM(III)(OH)_{(2x+2)}$(stearate)(hydrocarbon) and $M(II)_xM(III)(OH)_{(2x+2)}$(stearate)(stearic acid)(hydrocarbon). For example, straight chain hydrocarbons, such as straight chain hydrocarbons with 18 carbon atoms or less, such as octadecane, and hydrocarbon mixtures such as commercial light (with an average of approximately 30 carbon atoms) or heavy mineral oil, are incorporated in the LDH materials. These materials are incorporated through intercalation, wetting or intimate admixing.

In one embodiment, the present invention is a layered double hydroxide material that can be aggregated into the form of macroscopic pellets or chunks by stirring with surfactant; for example, $Zn_2Al(OH)_6$ Westvaco diacid derivative, aggregated into pellets of diameter 1-5 mm by heating at approximately 100° C. with excess of the diacid disodium salt. Such materials are expected to be more useful than conventionally prepared LDH, which tend to form impervious beds of crystallites of colloidal dimension.

In the method of the present invention comprises LDH compounds that can have structural features different than the conventional plate-like structure of prior LDH compounds. For example, scanning and transmission electron microscopies have determined that LDH compounds having curved ribbon and raft-like structures have been formed, replacing the hexagonal plate structure or morphology of conventional LDH materials. Moreover, in these ribbon structures, the metal hydroxide structural motif is approximately perpendicular to, rather than parallel to, the well developed faces. There is thus an enhanced proportion of edge and near-edge sites, expected to be of great importance in adsorption and exchange processes. This property can be beneficial in applications such as the removal of toxic anions and of anionic radioactive materials, such as arsenate, pertechnetate, radioactive iodide and selenate. Improved blending with organics can also be expected. These LDH materials can also be useful in removal of hydrocarbons and organic contaminants through interaction with the hydrophobic parts of the anionic surfactants Y, or through occupying vacant space caused by imperfect packing within this structure.

Porous or dispersed materials derived from LDH compounds can be prepared by heating the above materials in air. For example, a material prepared by heating $Mg_2Al(OH)_6$ (stearate)(hydrocarbon) to 350° C. for 6 hr, results in an LDH material containing sheets with folds less than 20 nm thick, and crystallites with maximum dimension less than 50 nm. Heating a similar material at 350° C. for 3 hr gave a material with a specific surface area of 60 m²/g, 33 cc/g pore volume, and average pore size 22 nm.

In preparing LDH material, it is usual to combine together the isolated anionic compound with the other ingredients. In the present invention, LDH materials using a surfactant as the anionic component can be successfully formed by hydrolysis of a precursor (such as olive oil) with alkali, followed by addition of metal salts, without ever isolating the surfactant from the alkaline hydrolysate. This method can be applied quite generally to the formation of LDH-surfactant from fats and oils.

EXAMPLES

Example 1

Formation of Magnesium Aluminum LDH Dowfax Material

Mix 20 mL 0.3M $AlCl_3$ solution, 20 mL 0.6M $MgCl_2$ solution, 20 mL distilled water, and 14.5 mL Dowfax 8390 as supplied, and add while stirring 2.0 mL 50% w/w NaOH solution. Reflux for 12 hr while stirring, and wash repeatedly by centrifuge until the wash water is no longer frothy. The product is formed as a solid with waxy texture that adheres to itself in flocs.

Example 2

Formation of Magnesium Aluminum LDH Stearate/Stearic Acid/Mineral Oil 2.83 g stearic acid were added to 50 mL of a solution prepared by dissolving 24.20 g (0.1002 mol) $AlCl_3 \cdot 6H_2O$ and 40.80 g (0.2007 mol) $MgCl_2 \cdot 6H_2O$ in distilled water to a total volume of 1 L, and 2.35 mL 50% w/w NaOH and 5.0 mL light mineral oil added. The mixture was heated to reflux with stirring for 16 hr and allowed to cool. On cooling, the mixture set to a solid mass of soft texture, which was mechanically broken up into lumps and washed repeatedly at the pump to produce a material that floated on water.

Example 3

Formation of Magnesium Aluminum LDH Stearate/Stearic Acid/Octadecane 2.5 mol stearic acid, 25 mL distilled water, 0.631 g octadecane, and 0.95 mL 50% w/w NaOH solution are mixed with 25 mL of a solution prepared by dissolving 24.20 g (0.1002 mol) $AlCl_3 \cdot 6H_2O$ and 40.80 g (0.2007 mol) $MgCl_2 \cdot 6H_2O$ in distilled water to a total volume of 1 L, and the mixture heated to reflux for approximately 36 hours. On cooling, the mixture separates into three parts; a white solid of approximate composition $Mg_2Al(OH)_6$(stearate)$.aH_2O$ but possibly containing intimately admixed or bonded octadecane; an aqueous layer; and a translucent waxy solid, less dense than the aqueous layer, that is found by infrared spectroscopy to contain up to 50% $Mg_2Al(OH)_6$(stearate). $aH_2O$ combined or intimately admixed with octadecane.

Example 4

Formation of Zinc Aluminum LDH Elaidate

The precursor $Zn_2Al(OH)_6Cl \ aH_2O$ (1.33 g, approximately 4.0 mmol) was refluxed overnight in 100 mL elaidate solution (0.06 N, pH=10.4) which was made up by dissolving 6.0 mmol elaidic acid in 100 mL NaOH solution (0.06 N). After cooling, the solid product was collected by separating via centrifuge and thoroughly washing with deionized water, and then dried over molecular sieves in a vacuum desiccator.

Example 5

Formation of the Sandopan-LDH Cerivative Zinc Aluminum Hydroxide DTC

DTC acid ($C_{13}H_{27}(OCH_2CH_2)_6OCH_2COOH$, 5.0 mmol) was first neutralized with 100 mL NaOH solution (0.05 N). Then the precursor $Zn_2Al(OH)_6Cl.aH_2O$ (1.66 g, approximately 5.0 mmol) was refluxed overnight in this anion solution. The product was collected by separating via centrifuge and thoroughly washing with deionized water, and then dried over molecular sieves in a vacuum desiccator to give a sticky, waxy product.

Example 6

Formation of Magnesium Aluminum LDH Oleate from Olive Oil

Olive oil (4.56 g, approximately 5.0 mmol) was hydrolyzed in 100 mL NaOH solution (approximately 0.76 N) at approximately 70° C. for 6 hours under a slow stream of nitrogen. Then 30 mL of a solution containing $Al^{3+}$ (approximately 10.0 mmol, 2.414 g $AlCl_3 \cdot 6H_2O$) and $Mg^{2+}$ (approximately 20.0 mmol, 4.066 g $MgCl_2 \cdot 6H_2O$) was added drop by drop to the above treated solution. After refluxing overnight, the precipitation was collected by separating via centrifuge and thoroughly washing with deionized water, and then dried over molecular sieves in a vacuum desiccator.

Example 7

Synthesis of Metal Oxide-Carbon Composite Absorption Material

In one embodiment to make a Zn—Al oxide-carbon nanocomposite absorption material, the following synthesis was performed:

1) 10 mmol stearic acid (2.85-2.90 g, 95%) was dispersed in 250-300 ml water containing 70 mmol $OH^-$ (3.66 ml 50% NaOH solution) on heating to 70-80° C. under stirring for 15-30 min until no separate stearic acid particles were visible to form a stearate solution. Heating helps the dispersion of the stearic acid and also the neutralization.

2) A mixed solution (40-50 ml) consisting of $ZnCl_2$ (20 mmol, 2.73 g) and $AlCl_3 \cdot 6H2O$ (10 mmol, 2.41 g) were added dropwise into the stearate solution with vigorous stirring.

3) The mixture was aged at 95-100° C. overnight.

4) After cooling, the solid product (precipitates) were separated and washed with deionized water for 3-4 times via centrifuge.

5) The precipitates were dried at 60-80° C. or in vacuum. The obtained material is a monolayer-LDH. To make a bilayer-LDH, a stearic/Al ratio of 2.5 and an $OH^-$ concentration of 80-85 mmol can be used.

6) The obtained ZnAl-Stearate-LDH was flushed by N2 (ultra high purity) for 0.5 to 1 h, followed by heating at a heating rate of 1 degree per minute to 400° C., then maintained at 400° C. for 2 h, and finally cooled down to a room temperature (or 50-100° C.) under a slow stream of $N_2$.

Example 8

Preparation of LDH-Stearate $Zn_2Al(OH)_6$(stearate) $.nH_2O$

First, 43.6 g of stearic acid (0.15 mol, Aldrich, 95%) was dissolved in 1.5 L of deionized water containing 1.04 mol NaOH with gentle heating (70-80° C.). Then ca. 200 ml of a mixed metal ion solution, containing 0.15 mol of $AlCl_3 \cdot 6H_2O$ (Aldrich, 99%) and 0.30 mol of $ZnCl_2$ (Aldrich, 98%) was slowing added into the stearate solution with vigorous stirring. After addition, the mixture solution was heated to approximately 90° C. overnight with continuous stirring. Then the solid product was separated in a warm state (approximately 50° C.) and thoroughly washed with deionized water via centrifuge for three times, and dried in an oven at 70° C. The filtrate pH was measured to be 8.7, showing the alkalinity of the preparation solution. XRD and FTIR indicated the packing of stearate is monolayer, with very limited bi-layer component. The elemental analysis and TGA give a nominal formula of $Zn_2Al(OH)_6(C_{17}H_{35}COO)\cdot 1.5H_2O$ (MW is ca. 570).

In one embodiment, the material was calcined by flushing the $Zn_2Al$-stearate-LDH (powder, 50 grams) by $N_2$ for half an hour, then heated up to 400° C. at a heating rate of 1° C./min. Calcination at 400° C. in $N_2$ was continued for 2 hrs and then cooled to 50° C. Black samples were collected for subsequent absorption testing. The product is identified hereinafter as sample ZAS400N1.

TGA shows that as-prepared oxide/carbon composite has C/Al ratio close to 8-10 while its initial ratio in LDH is 18, meaning about half carbons are retained.

In another embodiment, calcination of the $Zn_2Al$-stearate-LDH in an open air environment resulted in burning of the sample at 300-400° C. The burning releases a large amount of heat, which causes the local overheat and speeds up the burning. The oxide product derived in such a way is severely sintered, is no longer porous, and is no longer characterized by the reconstruction to LDH phase which is crucial for the removal of toxic anions in water purification. In order to avoid this result, two methods were used. (1) The powder $Zn_2Al$-stearate-LDH was first pressed into pellets that were weighed 0.4-0.5 g each. (2) Passing limited air instead of open air was applied. The calcination procedure using air was to heat the $Zn_2Al$-stearate-LDH (pellet, 50 grams) to 250° C. at a heating rate of 5° C./min and then to 400° C. at a heating rate of 1° C./min in flowing air. The heating at 400° C. in air was continued for 2 hrs and then cooled to 50° C. Calcination in both air and nitrogen resulted in a good absorbent material. The product is identified hereinafter as sample ZAS400N3.

Example 9

Preparation of $Mg_2Al$-stearate-LDH and its Derivatives

The preparation is similar to that of Example 8 except that $ZnCl_2$ is replaced with $MgCl_2\cdot 6H_2O$ (Aldrich, 99%). When calcining in nitrogen, the $Mg_2Al$-stearate-LDH (powder, 2 grams) was flushed by $N_2$ for half an hour, then heated up to 400° C. at a heating rate of 1° C./min. Calcination at 400° C. in $N_2$ was continued for 2 hrs and then cooled to 50° C.

Example 10

Preparation of $Zn_2Al$-terephthalate-LDH and its Derivatives 4.98 g of terephthalic acid (30 mmol, p-COOH-ph-COOH, avocado, 98%) was dissolved in 0.6 L of deionized water containing 0.36 mol NaOH with stirring. Then ca. 100 ml of a mixed metal ion solution, containing 50 mmol of $AlCl_3\cdot 6H_2O$ (Aldrich, 99%) and 100 mmol of $ZnCl_2$ (Aldrich, 98%) was slowing added into the above alkaline solution with vigorous stirring. After addition, the mixture solution was refluxed overnight with continuous stirring. Then the mixture was cooled down, separated and thoroughly washed with deionized water via centrifuge for three times, and finally dried in an oven at 60-70° C.

The $Zn_2Al$-terephthalate-LDH (powder, 4 grams) was flushed by $N_2$ for half an hour, then heated up to 400° C. at a heating rate of 1° C./min and calcined at 400° C. for 2 hours. It was then heated to 500° C. at a heating rate of 1° C./min and calcined at 500° C. for other 2 hours. Later it was heated to 550° C. at a heating rate of 2° C./min and calcined at 550° C. for another 2 hours. Then it was cooled to room temperature at 5° C./min. The product is identified hereinafter as sample ZAT10BN.

In another embodiment, the $Zn_2Al$-terephthalate-LDH (powder, 4 grams) was flushed by $N_2$ for half an hour, then heated up to 550° C. at a heating rate of 2° C./min and calcined at 550° C. for 2 hours. Then it was cooled to room temperature at 5° C./min. The product is identified hereinafter as sample ZAT10CN.

This calcination procedure produces the same material composition as the previous calcination; different calcination procedures can have an affect on the absorption characteristics of the resultant material.

Example 10

Batch Sorption of Lead, Arsenic, and Selenium 0.05 or 0.1 grams of the synthesized nanocomposite absorption material from material ZAT10CN were equilibrated with DI water overnight. The Pb solution was then added to reach the desired concentration (10 ppm for Pb). Total volume of suspension in each sample was 20 mL. Solution pH was adjusted with a dilute HCl solution. The suspensions were then stirred for 24 hours. Equilibrium pH was recorded. Samples were then filtered with 0.2 micron membrane filter (using a syringe filter). About 9 grams of the supernatant was collected in a plastic centrifuge tube. Before subjected to ICP analysis, the internal standard (Sc, 1 ppm) and concentrate nitric acid (1%) were added into the centrifuge tube. During the ICP analysis, QC checking was performed at the beginning, 10 samples interval and at the end of the analysis. Finally, the data were re-examined and re-processed according to the calibration curve. The same procedure was also used for As and Se sorption experiments, with the exception that the initial concentrations of As and Se were made to be 20 ppm.

The results of the tests are shown in Tables 1 and 2. The results show a high sorption capability of the synthesized materials for both anionic and cationic contaminants. From an engineering point of view, it is important to point out that the material synthesized automatically becomes granular upon calcination and ready for engineering applications.

TABLE 1

Measured anion sorption coefficients ($K_d$)

| | As | | Se | |
|---|---|---|---|---|
| Sample | pH | $K_d$ (ml/g) | pH | $K_d$ (ml/g) |
| ZA S400N1 | 6.9 | 270,000 | 6.8 | 46,000 |
| ZA S400N3 | 7.0 | 208,000 | 6.9 | 16,000 |

TABLE 2

Measured cation sorption coefficients (Kd)

| Sample | Pb | |
|---|---|---|
| | pH | $K_d$ (ml/g) |
| ZA S400N1 | 6.79-6.97 | 33,600 |
| ZAT10BN | 9.44-10 | 35,700 |
| ZAT10CN | 8.89-9.67 | 38,000 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method for absorbing an ion from a fluid, comprising;
   dispersing an organic acid of the formula $C_aH_bO_c$, where $a \geq 7$, $b>0$ and $c>0$, in water to form an anion surfactant solution;
   mixing a divalent-metal cation M(II) containing compound with a trivalent-metal cation M(III) containing compound into said anion surfactant solution to form a precursor solution;
   heating said precursor solution to form a solid layered double hydroxide product in solution;
   separating said solid layered double hydroxide product from said solution;
   calcining said solid layered double hydroxide product to form an absorption material of the formula $M(II)_xM(III)(OH)_{2x+2}(Y/n).zH_2O$, where M(II) is a divalent metal cation, M(III) is a trivalent metal cation, x is a positive number between 1.5 and 12, Y is an anionic surfactant comprising at least 7 carbon atoms, n is a positive integer, and z is a positive number less than 10; and
   contacting said absorption material with an aqueous solution containing at least one charged ion, said at least one charged ion selected from the group consisting of lead, arsenic, selenium, and combinations thereof.

2. The method of claim 1 wherein the divalent-metal containing compound comprises a divalent metal selected from $Co^{2+}$, $Ni^{2+}$, $Zn^{2+}$, $Mg^{2+}$, $Cu^{2+}$, $Cr^{2+}$, $Mn^{2+}$, and $Fe^{2+}$.

3. The method of claim 1 wherein the trivalent-metal containing compound comprises a divalent metal selected from $Cr^{3+}$, $Al^{3+}$, $Fe^{3+}$, $Sc^{3+}$, $Ti^{3+}$, $V^{3+}$, $Mn^{3+}$, $Co^{3+}$, $Ni^{3+}$, $Rh^{3+}$, $Ru^{3+}$, and $Ir^{3+}$.

4. The method of claim 1 wherein the organic acid is selected from stearic acid, terephthalic acid, elaidic acid, and oleic acid.

5. The method of claim 1 wherein the absorption material has a surface area of approximately 60 $m^2$/g and an average pore size of approximately 20 nm.

6. The method of claim 1 wherein the solid layered double hydroxide product is monolayered.

7. The method of claim 1 wherein the solid layered double hydroxide product is bilayered.

8. A method for absorbing an ion from a fluid, comprising;
   dispersing an organic acid selected from the group consisting of stearic acid, terephthalic acid, elaidic acid, and oleic acid in water in the presence of an hydroxide ion to form an anion surfactant solution;
   mixing a divalent-metal cation M(II) containing compound with a trivalent-metal cation M(III) containing compound into said anion surfactant solution to form a precursor solution;
   heating said precursor solution to form a solid layered double hydroxide product in solution;
   separating said solid layered double hydroxide product from said solution;
   calcining said solid layered double hydroxide product to form an absorption material of the formula $M(II)_xM(III)(OH)_{2x+2}(Y/n).zH_2O$, where M(II) is a divalent metal cation, M(III) is a trivalent metal cation, x is a positive number between 1.5 and 12, Y is an anionic surfactant comprising at least 7 carbon atoms, n is a positive integer, and z is a positive number less than 10; and
   contacting said absorption material with an aqueous solution containing at least one charged ion, said at least one charged ion selected from the group consisting of lead, arsenic, selenium, and combinations thereof.

9. The method of claim 8 wherein the divalent-metal containing compound comprises a compound selected from a Zn-containing compound and a Mg-containing compound.

10. The method of claim 9 wherein the trivalent-metal containing compound is an Al-containing compound.

11. The method of claim 8 wherein the aqueous solution had a pH greater than 6 and less than or equal to 10.

12. The method of claim 8 wherein the solid layered double hydroxide product is monolayered.

13. The method of claim 8 wherein the solid layered double hydroxide product is bilayered.

* * * * *